US006997443B2

(12) United States Patent
Jean

(10) Patent No.: US 6,997,443 B2
(45) Date of Patent: Feb. 14, 2006

(54) JACK FOR A VEHICLE

(76) Inventor: Wen-Fong Jean, No.1921, Chunrih Rd., Taoyuan City, Taoyuan County 330 (TW)

( * ) Notice: Subject to any disclaimer, the term of this patent is extended or adjusted under 35 U.S.C. 154(b) by 155 days.

(21) Appl. No.: 10/733,106

(22) Filed: Dec. 10, 2003

(65) Prior Publication Data

US 2005/0127341 A1    Jun. 16, 2005

(51) Int. Cl.
*B66F 7/24* (2006.01)

(52) U.S. Cl. .................................... 254/424

(58) Field of Classification Search ............... 254/424, 254/419, 418, 86 R

See application file for complete search history.

(56) References Cited

U.S. PATENT DOCUMENTS 3,826,470 A * 7/1974 Spear ..................... 254/424

* cited by examiner

*Primary Examiner*—Robert C. Watson
(74) *Attorney, Agent, or Firm*—Pro-Techtor Int'l Services

(57) ABSTRACT

A jack for a vehicle includes a main frame fixed to an underside of a vehicle. A screw rod extends through two end plates that are respectively formed on two ends of the main frame. A movable member and a fixed member are respectively mounted on the screw rod. A lower supporting member includes a lower end in contact with the ground and an upper end pivotally connected to the movable member. The connecting member includes a first end pivotally connected to the fixed member and a second end pivotally connected to an intermediate portion of the lower supporting member. The lower supporting member and the connecting member are moved to a position for supporting the vehicle when the screw rod is turned in a direction. The lower supporting member and the connecting member are folded when the screw rod is turned in a reverse direction.

5 Claims, 10 Drawing Sheets

JACK FOR A VEHICLE

BACKGROUND OF THE INVENTION

1. Field of the Invention

The present invention relates to a jack for a vehicle. In particular, the present invention relates to a jack mounted to an underside of a vehicle to stabilize the vehicle during parking.

2. Description of the Related Art

A vehicle, such as a station wagon or camper, is usually parked at a place for a long period of time, and the users may proceed with daily activities in this vehicle. To improve the parking stability, such as to prevent the vehicle body from swaying when a user walks in the vehicle, a jack is mounted to an underside of the vehicle. The jack is in an unfolded state when in use or in a folded state when not in use. A typical jack of this type generally includes a plate-like main frame secured to the underside of the vehicle and a screw rod directly below the main frame as well as other elements. However, the portions of the jack supporting the vehicle have weak structures, adversely affecting the stability of the parked vehicle.

SUMMARY OF THE INVENTION

In accordance with an aspect of the invention, a jack for a vehicle includes a main frame, a screw rod, a movable member, a fixed member, a lower supporting member, and a connecting member. The main frame includes a first end, a second end, and two sides. A first end plate is integrally formed on the first end of the main frame and has a first hole. A second end plate is integrally formed on the second end of the main frame and has a second hole aligned with the first hole of the first end plate. The first end and the second end of the main frame are fixed to an underside of a vehicle.

The screw rod has a first end extending through the first hole of the first end plate and a second end extending through the second hole of the second end plate. The second end of the screw rod can be driven to cause rotation of the screw rod. The movable member is mounted on the screw rod and located adjacent to the first end of the screw rod. The movable member is slidable along the screw rod when the screw rod is turned.

The fixed member is fixed to the main frame and located adjacent to the second end of the screw rod. The lower supporting member includes a lower end in contact with a ground and an upper end pivotally connected to the movable member. The connecting member includes a first end pivotally connected to the fixed member and a second end pivotally connected to an intermediate portion of the lower supporting member.

When the screw rod is turned in a direction, the movable member moves in a direction along the screw rod, thereby moving the lower supporting member and the connecting member to a position for supporting the vehicle. The vehicle can be supported and thus be stable. When the screw rod is turned in a reverse direction, the movable member moves in a reverse direction along the screw rod, thereby moving the lower supporting member and the connecting member to a folded state.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
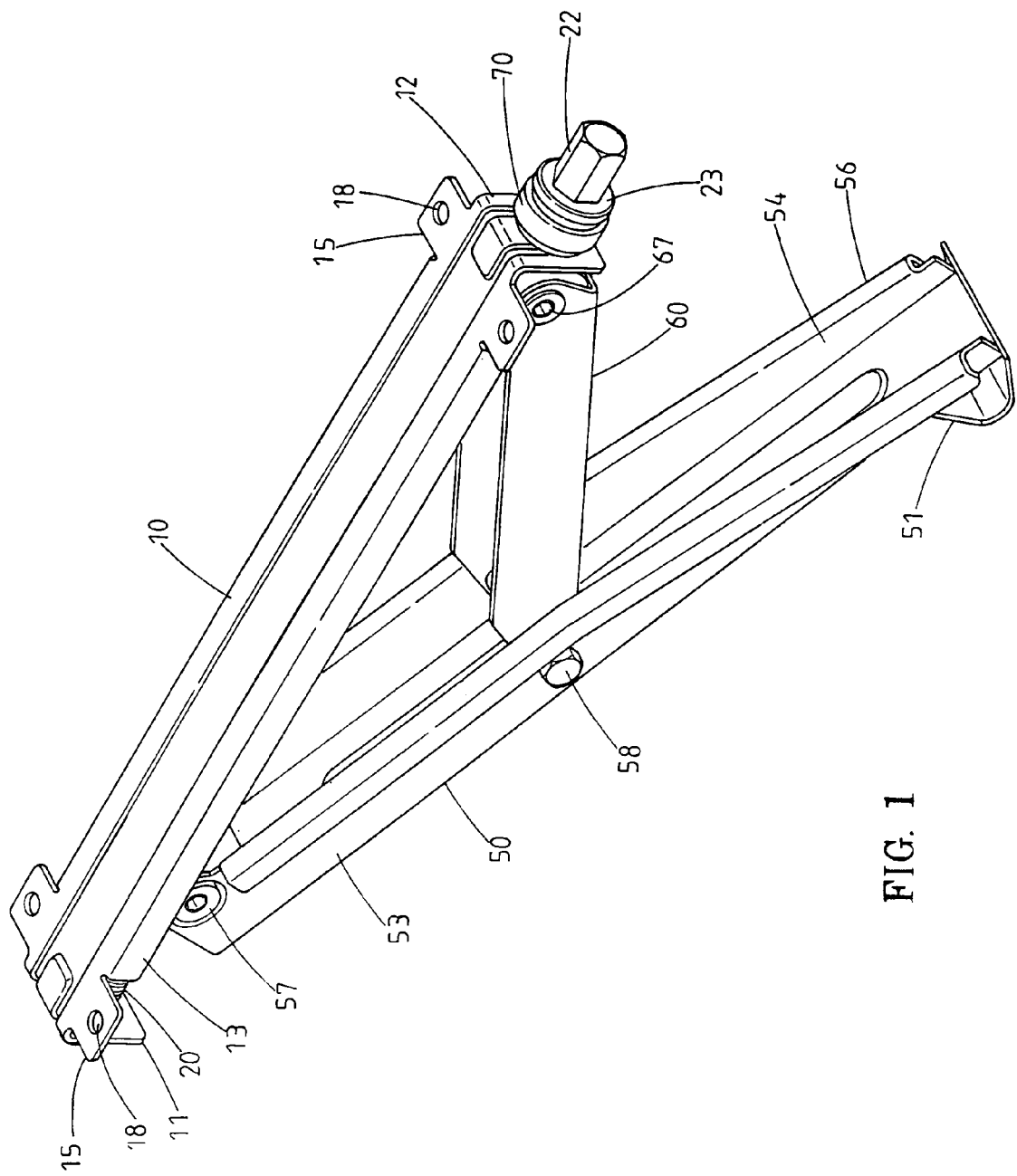
FIG. 1 is a perspective view of a jack in accordance with the present invention.

Referring to FIGS. 1 through 6, a jack in accordance with the present invention generally comprises a main frame 10, a screw rod 20, a movable member 30, a fixed member 40, a lower supporting member 50, and a connecting member 60. The main frame 10 includes a first end plate 11 formed on a first end of the main frame 10, a second end plate 12 formed on a second end of the main frame 10, and two lateral wings 13 and 14 formed along two lateral sides of the main frame 10, all of which are formed by means of pressing, with the main frame 10 remaining as an integral member. The first and second end plates 11 and 12 include aligned holes 16 and 17. Further, two lugs 15 are formed on a joint area between the first end plate 11 and the main frame 10, and two further lugs 15 are formed on a joint area between the second end plate 12 and the main frame 10. The respective lug 15 includes a fixing hole 18, allowing the jack to be secured to an underside of a vehicle (not shown).

Figure 5:
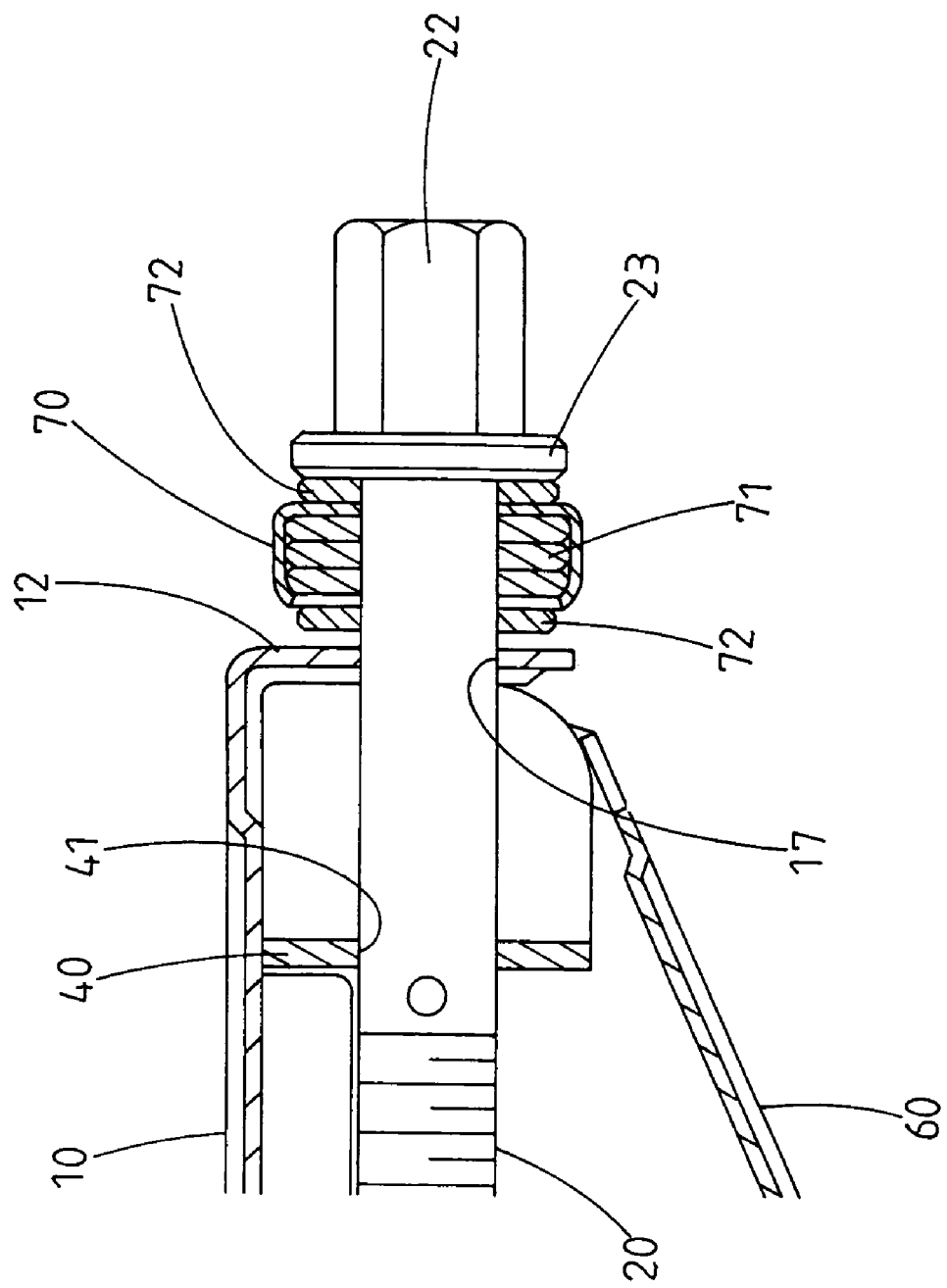
FIG. 5 is a partial sectional view of the jack in accordance with the present invention.
Figure 6:
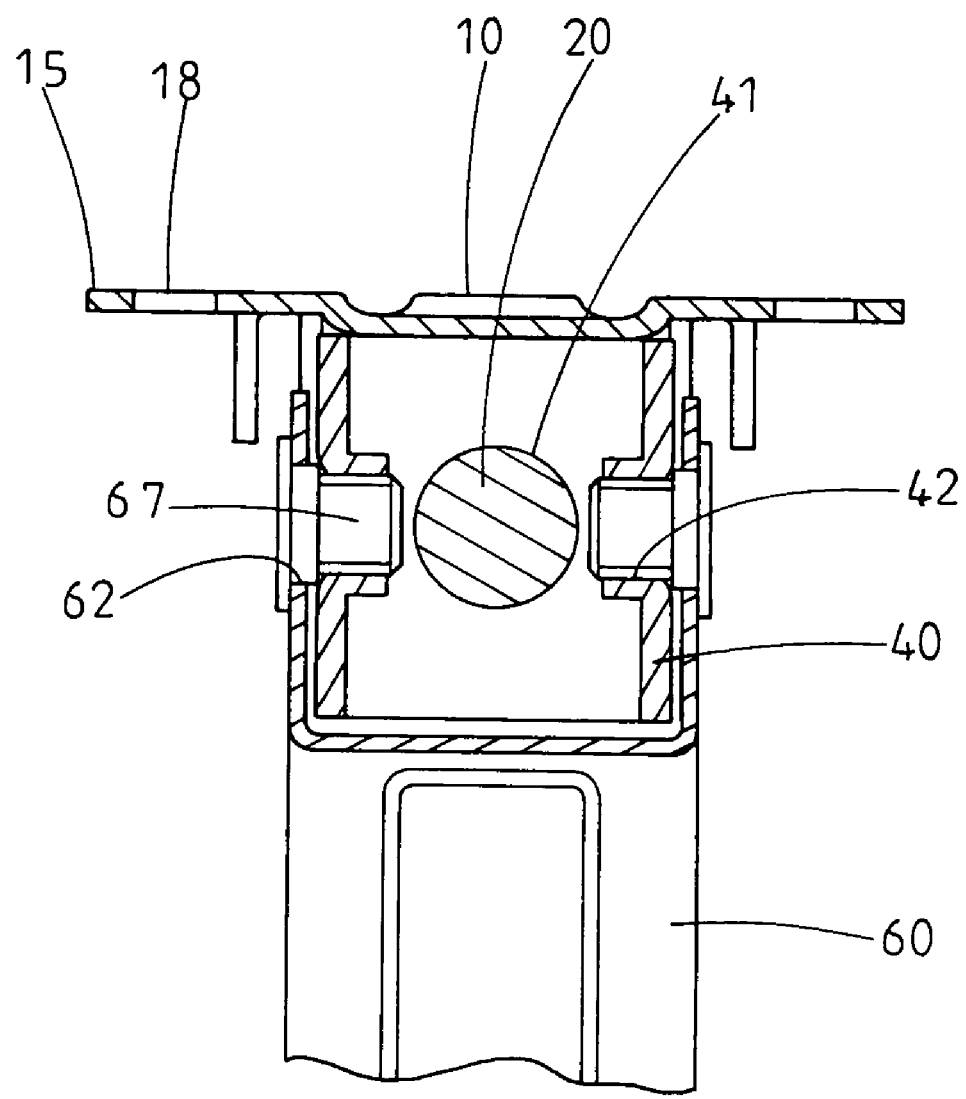
FIG. 6 is a sectional view taken along plane B—B in FIG. 2.

The screw rod 20 includes a first and 21 and a second end 22 respectively extending through the holes 16 and 17 of the first and the second end plates 11 and 12. The first end 21 of the screw rod 20 is tightened by a nut 24. The second end 22 of the screw rod 20 is preferably hexagonal and has an enlarged portion 23 (not necessarily hexagonal). Further, as illustrated in FIG. 5, a shock-absorbing sleeve 70 is mounted on the screw rod 20 and located between the enlarged portion 23 and the second end plate 12. In this embodiment, the shock-absorbing sleeve 70 includes a plurality of inner washers 71 mounted therein and two outer washers 72 respectively on two sides of the shock-absorbing sleeve 70. A gap (not labeled) is defined between the shock-absorbing sleeve 70 and the second end plate 12, allowing rotation of the screw rod 20.

The movable member 30 is mounted on the screw rod 20 and includes a hole 31 on an end thereof. A screw hole 32 is defined in each of two lateral sides thereof. A block 33 is fixed (e.g., by welding) to the other end of the movable member 30 and has a screw hole 34 aligned with the hole 31, with the screw rod 20 extending through the hole 31 and the screw hole 34.

Figure 2:
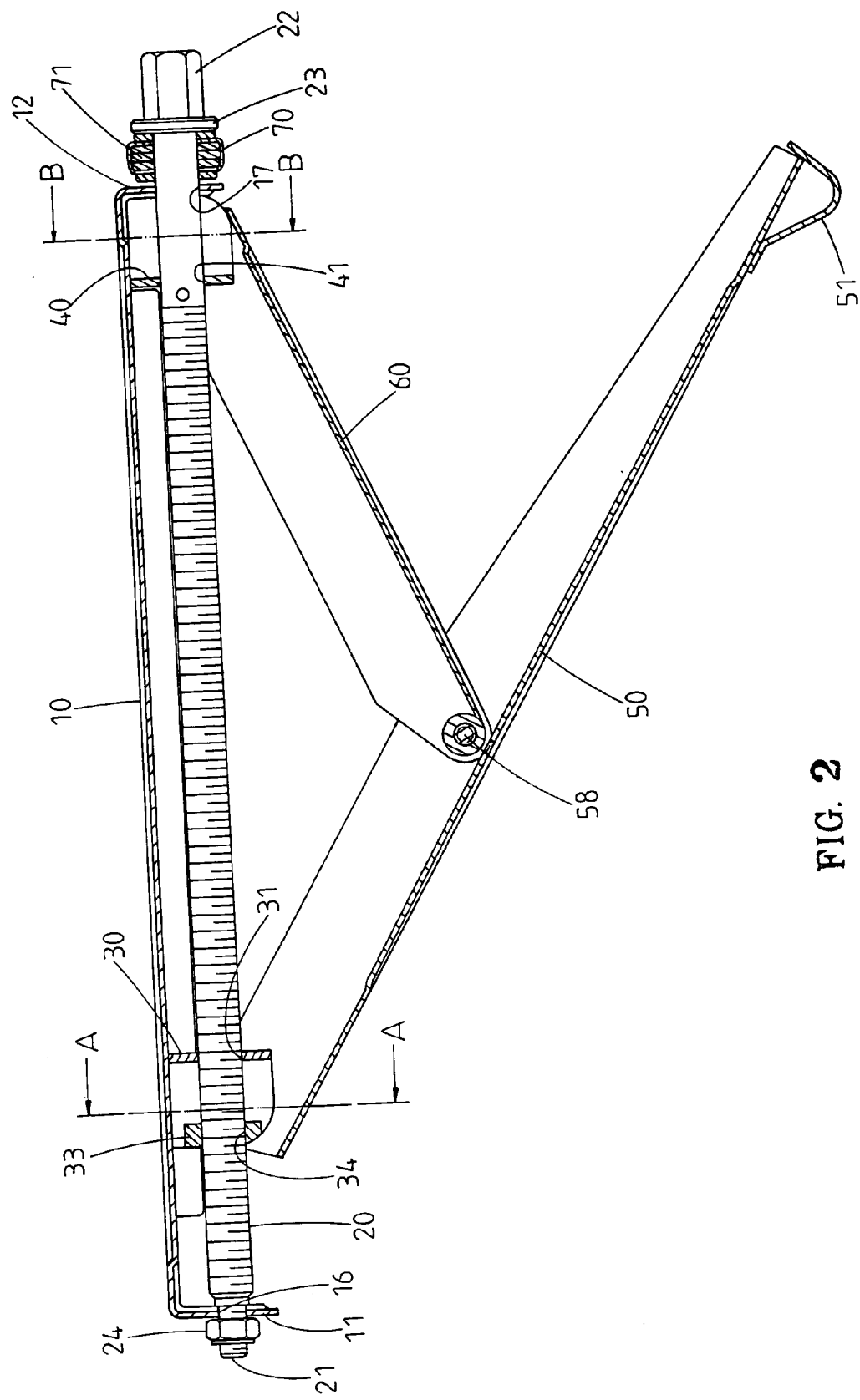
FIG. 2 is a sectional view of the jack in accordance with the present invention.
Figure 3:
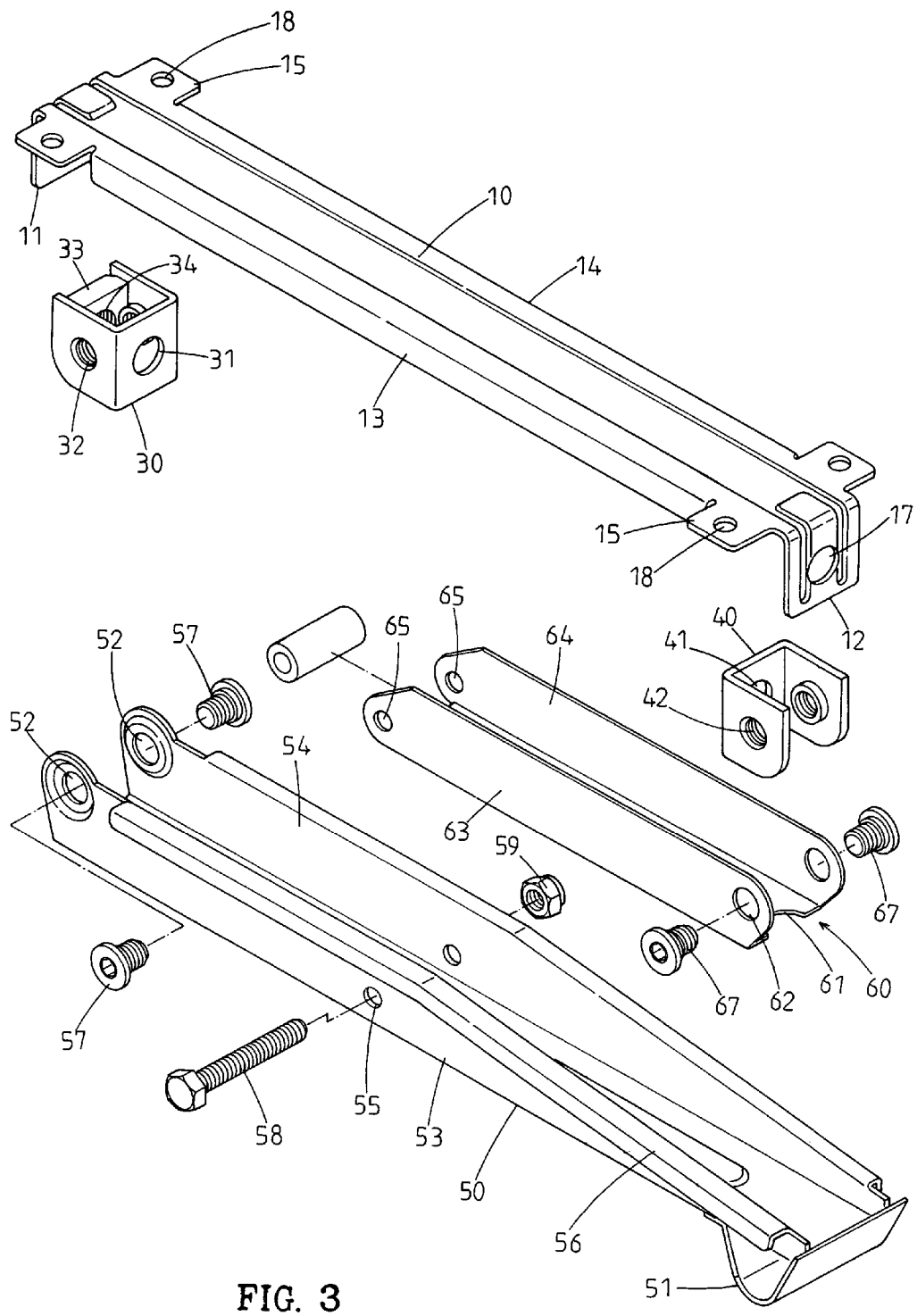
FIG. 3 is an exploded perspective view of the jack in accordance with the present invention.
Figure 4:
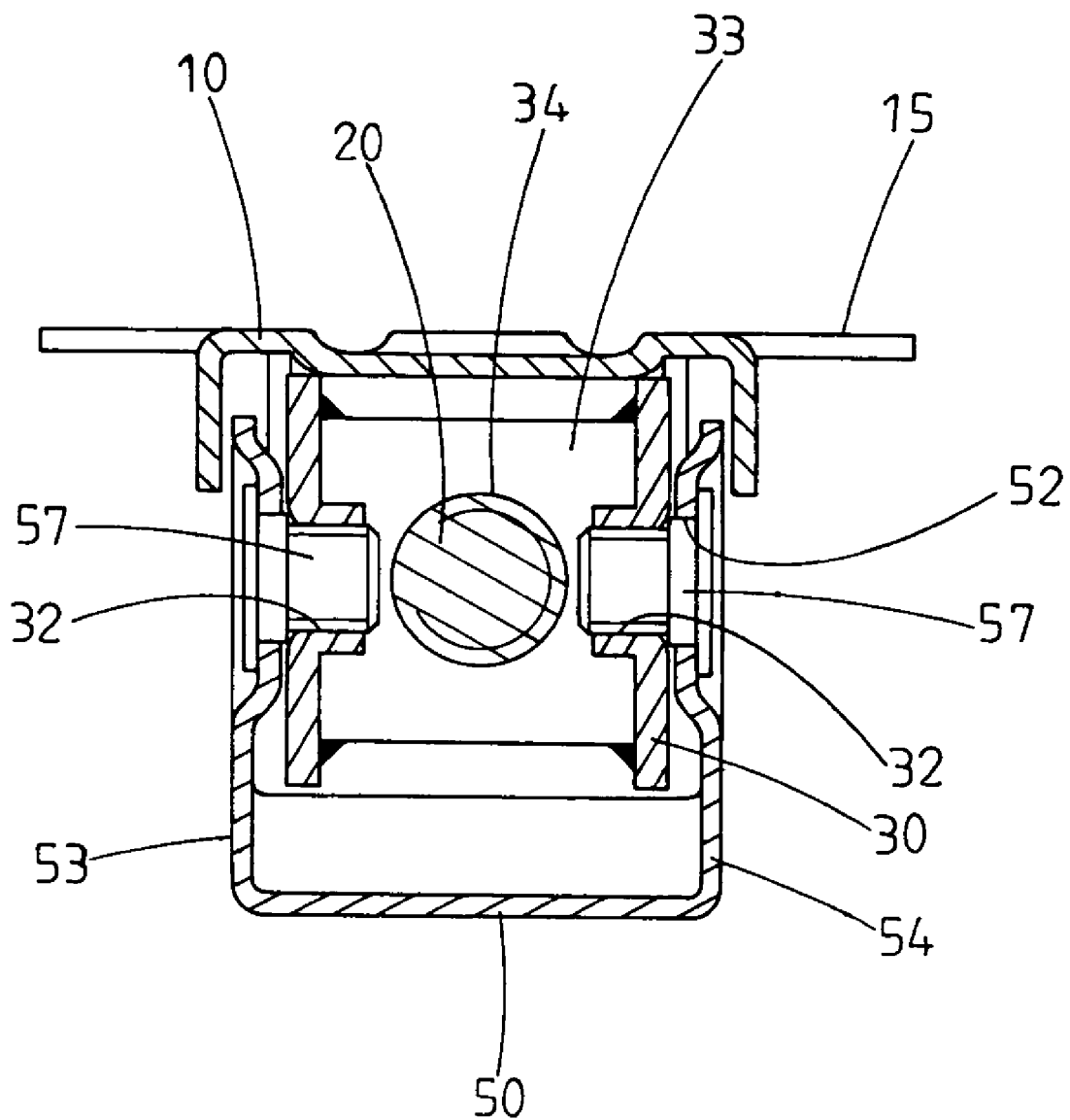
FIG. 4 is a sectional view taken along plane A—A in FIG. 2.

The fixed member 40 is fixed (e.g., by welding) to the main frame 10 and located on an inner side of the rear end plate 12, as shown in FIG. 2. The fixed member 40 includes a hole 41 in an intermediate portion thereof and a screw hole 42 in each of two lateral sides respectively extending from two sides of the intermediate portion thereof, with the screw rod 20 extending through the hole 41 of the fixed member 40.

The lower supporting member 50 has a certain length and includes a lower end 51 in contact with the ground and an upper end in which aligned holes 52 are defined. The movable member 30 is received in the upper end of the lower supporting member 50. A respective threaded member 57 is extended through the respective hole 52 of the lower supporting member 50 and the respective screw hole 32 of the movable member 30, thereby pivotally connecting the movable member 30 to the upper end of the lower supporting member 50. In this embodiment, the lower supporting member 50 is substantially U-shaped and includes two lateral sides 53 and 54 each having a reinforced section 56. Further, the lateral sides 53 and 54 of the lower supporting member 50 include aligned holes 55 in intermediate portions thereof.

The connecting member 60 is also substantially U-shaped and includes a notch 61 in a first end thereof. The connecting member 60 further includes two lateral sides 63 and 64, with two aligned holes 62 being defined in first ends of the lateral sides 63 and 64, and with two aligned holes 65 being defined in second ends of the lateral sides 63 and 64. A threaded member 67 is extended through the respective hole 62 of the connecting member 60 and the respective screw hole 42 of the fixed member 40, thereby pivotally connecting the first end of the connecting member 60 to the fixed member 40. Further, a bolt 58 is extended through the aligned holes 55 of the lower supporting member 50 and the holes 65 of the connecting member 60, with a nut 59 being engaged with a distal end of the bolt 58, thereby pivotally connecting the intermediate portion of the lower supporting plate 50 to the second end of the connecting member 60. The notch 61 of the connecting member 60 is provided to avoid interference of pivotal movement of the connecting member 60 by the fixed member 40.

Figure 7:
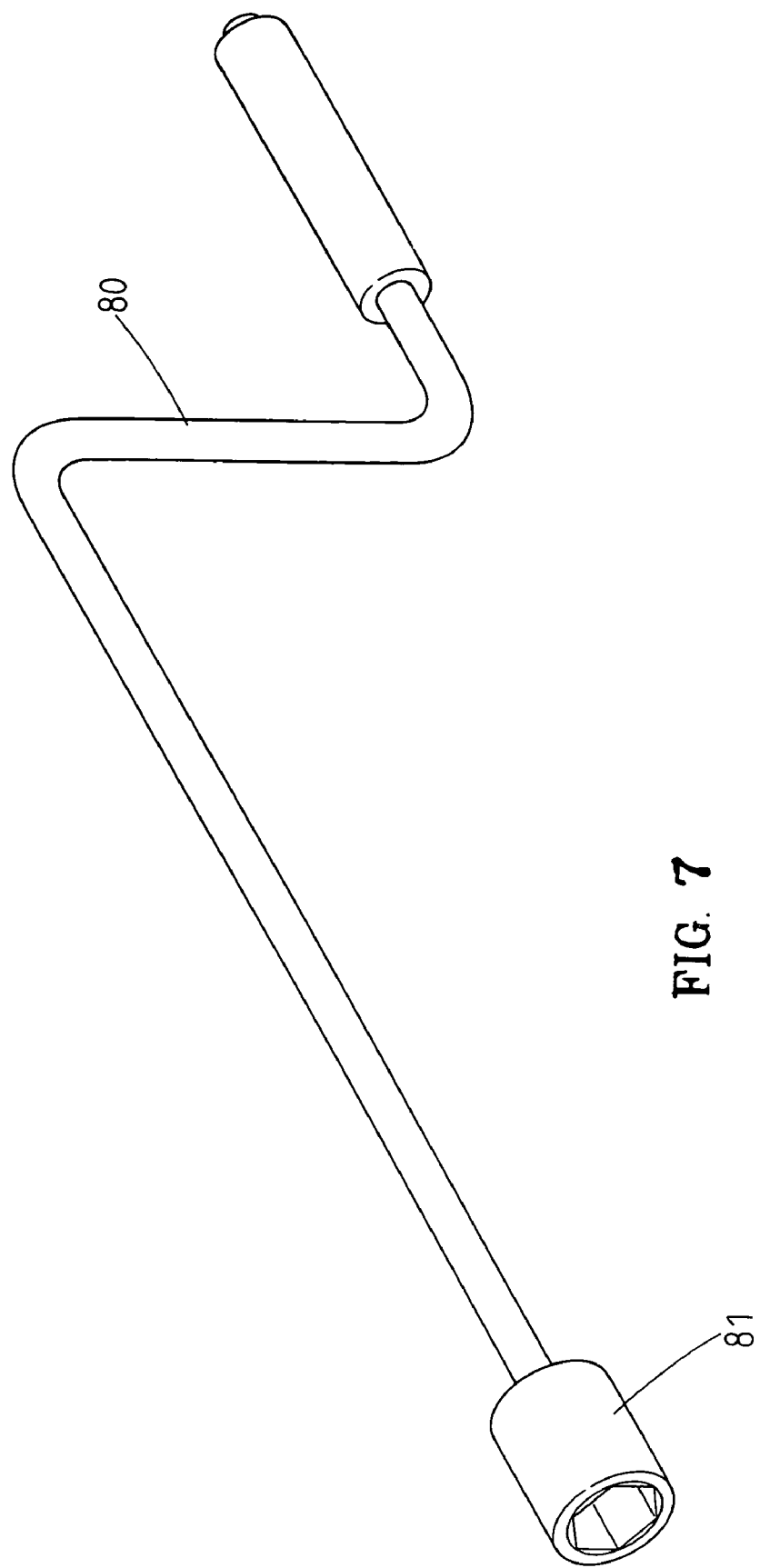
FIG. 7 is a perspective view of an operative rod for use with the jack in accordance with the present invention.
Figure 8:
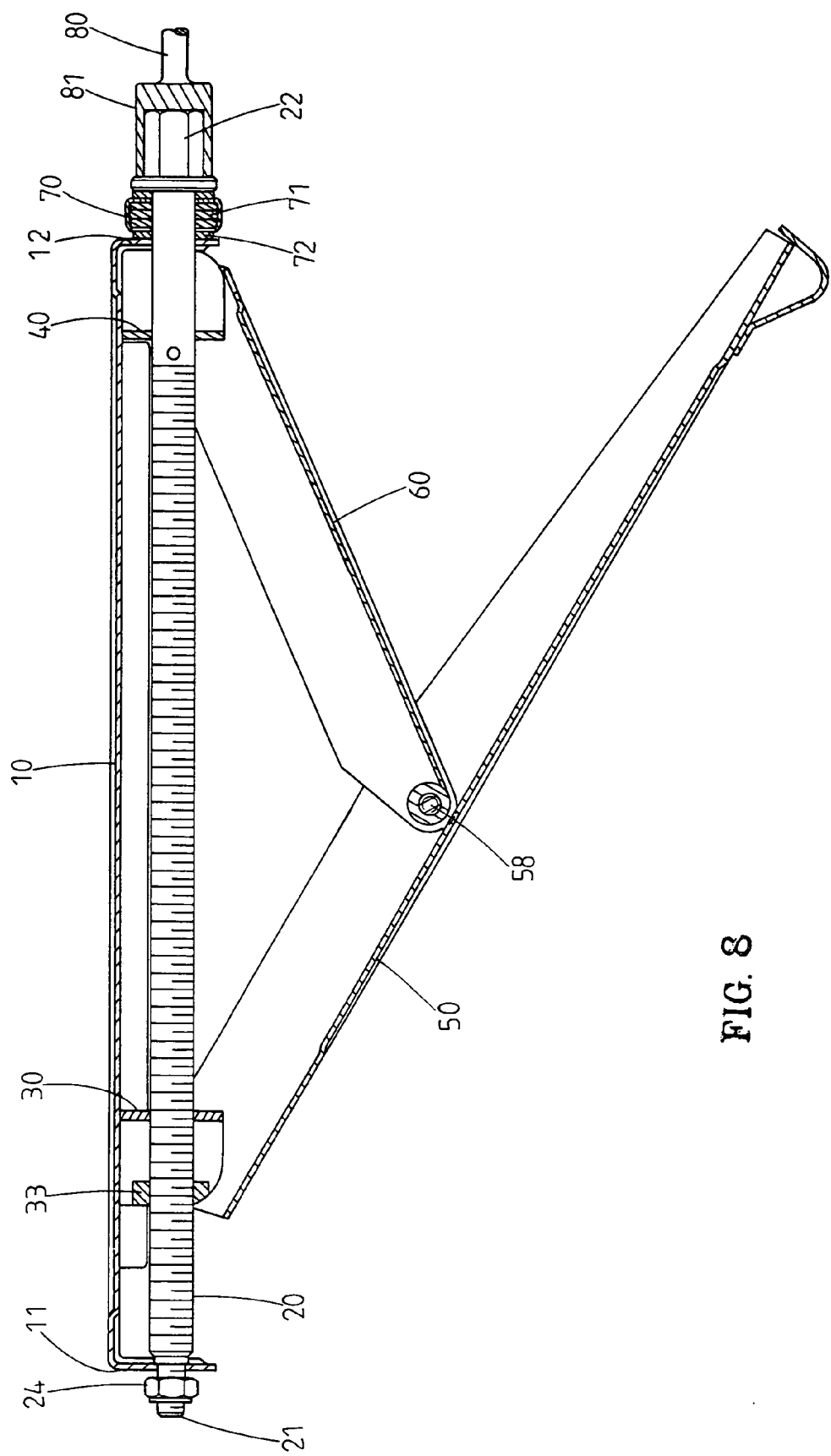
FIG. 8 is a sectional view of the jack in an unfolded state.
Figure 9:
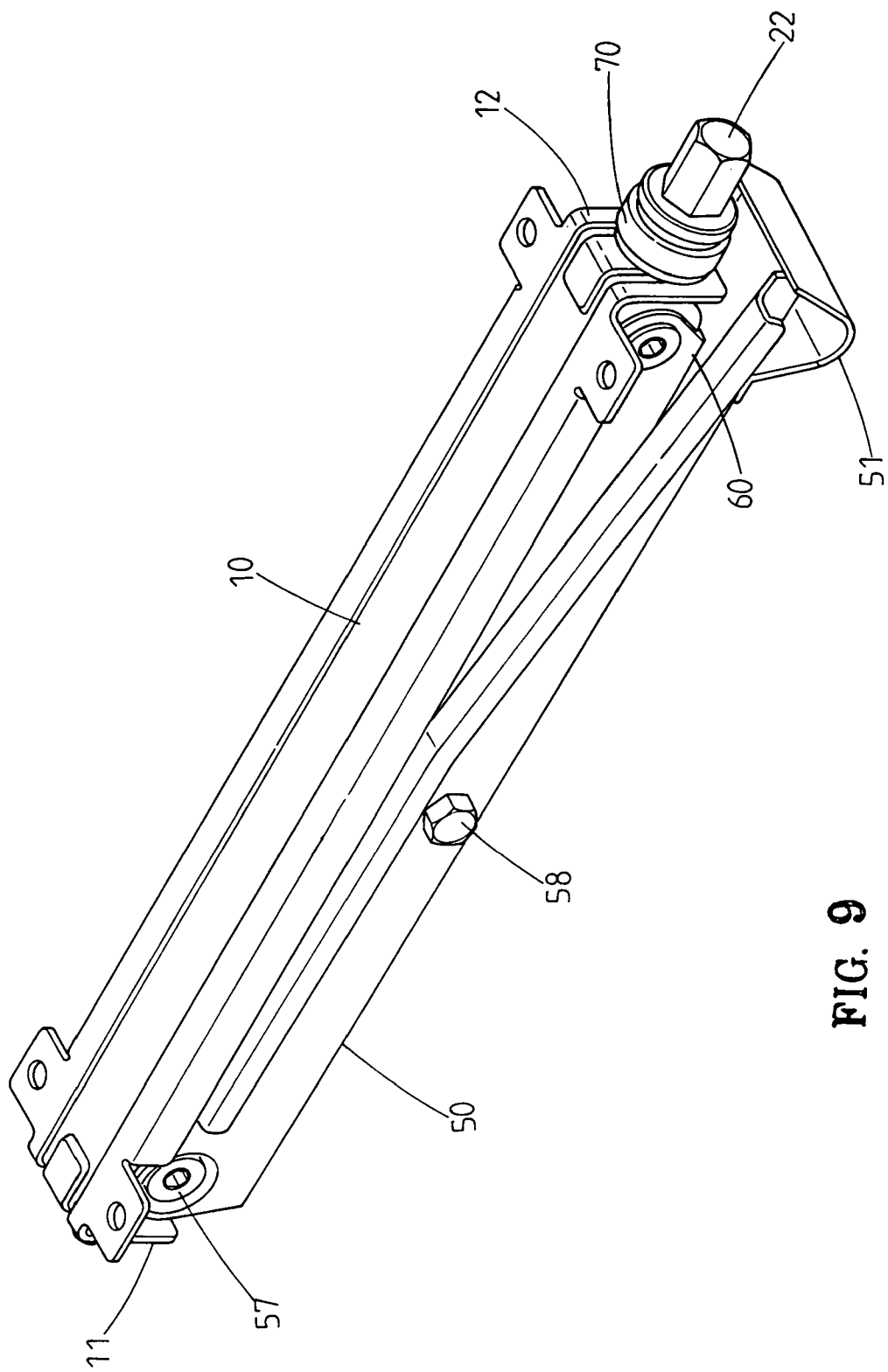
FIG. 9 is a perspective view of the jack in a folded state.
Figure 10:
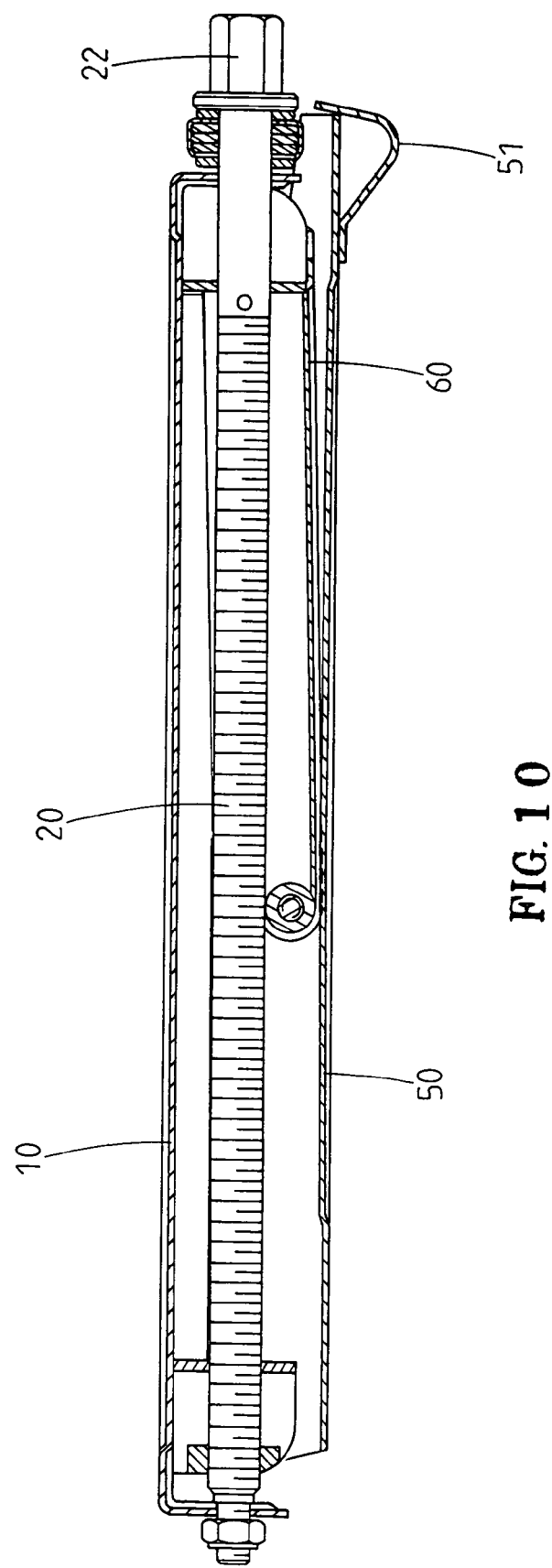
FIG. 10 is a sectional view of the jack in the folded state.

An operative handle 80 (FIG. 7) having a coupling end 81 can be used to operate the jack in accordance with the present invention. The coupling end 81 is in the form of a socket for engaging with the hexagonal portion of the second end 22 of the screw rod 20, as shown in FIG. 8. When the operative handle 80 is turned in a direction, the movable member 30 is actuated to move, e.g., rightward along the screw rod 20, which causes the lower supporting member 50 to pull the connecting member 60 downward. The jack can be moved to an unfolded state show in FIG. 8 for supporting the vehicle. Since the lower end of the lower supporting member 50 is in contact with the ground, the movable member 30 and the screw rod 20 slightly move forward such that the shock-absorbing sleeve 70 and the outer washers 72 press against the rear end plate 12 of the main frame 10, avoiding the screw rod 20 from turning in a reverse direction when shock occurs. On the other hand, when the operative handle 80 is turned in a reverse direction, the jack can be moved to a folded state shown in FIGS. 9 and 10.

The strength of the jack is improved, as the first and second end plates 11 and 12 are integral with the main frame 10, with two ends of the screw rod 20 extending through the movable member 30 and the fixed member 40. The stability of the parked vehicle is reliable.

Although the invention has been explained in relation to its preferred embodiment, it is to be understood that many other possible modifications and variations can be made without departing from the scope of the invention as hereinafter claimed.

What is claimed is:

1. A jack for a vehicle, comprising:
    a main frame including a first end, a second end, and two sides, a first end plate being integrally formed on the first end of the main frame and having a first hole, a second end plate being integrally formed on the second end of the main frame and having a second hole aligned with the first hole of the first end plate, the first end and the second end of the main frame being adapted to be fixed to an underside of a vehicle;
    a screw rod having a first end extending through the first hole of the first end plate and a second end extending through the second hole of the
    second end plate, the second end of the screw rod being adapted to be driven to cause rotation of the screw rod;
    a movable member mounted on the screw rod and located adjacent to the first end of the screw rod, the movable member being slidable along the screw rod when the screw rod is turned;
    a fixed member fixed to the main frame and located adjacent to the second end of the screw rod;
    a lower supporting member including a lower end in contact with a ground and an upper end pivotally connected to the movable member; and a connecting member including a first end pivotally connected to the fixed member and a second end pivotally connected to an intermediate portion of the lower supporting member;
    wherein when the screw rod is turned in a direction, the movable member moves in a direction along the screw rod, thereby moving the lower supporting member and the connecting member to a position for supporting the vehicle;
    wherein when the screw rod is turned in a reverse direction, the movable member moves in a reverse direction along the screw rod, thereby moving the lower supporting member and the connecting member to a folded state; and
    wherein the first end of the main frame and
    the first end plate have a first joint area therebetween, the second end of the main frame and the second end plate having a second joint area therebetween, two lugs being formed in each of the first joint area and the second joint area, the respective lug having a fixing hole, allowing the main frame to be fixed to the underside of the vehicle.

2. The jack as claimed in claim 1, wherein the second end of the screw rod includes an enlarged section, further including a shock-absorbing sleeve mounted on the screw rod and located between the enlarged section of the screw rod and the second end plate of the main frame.

3. The jack as claimed in claim 1, wherein the movable member includes a hole in an end thereof and two lateral sides each having a screw hole, a block being fixed to another end of the movable member, the block having a screw hole aligned with the hole of the movable member, the lower supporting plate being substantially U-shaped and having aligned holes in an upper end thereof, with a threaded member extending through the respective hole of the upper end of the lower supporting member and the respective screw hole of the movable member, thereby pivotally connecting the movable member to the upper end of the lower supporting member, and with the screw rod extending through the hole of the movable member and the screw hole of the block.

4. The jack as claimed in claim 3, wherein the connecting member is substantially U-shaped and has two lateral sides each having a first end and a second end, the fixed member including an intermediate portion having a hole through which the screw rod extends, the fixed member further including two lateral sides each having a screw hole, a further threaded member being extended through the first end of the respective lateral side of the connecting member and the respective screw hole of the fixed member.

5. The jack as claimed in claim 4, further including a bolt extending through an intermediate portion of the lower supporting member and the second end of the respective lateral side of the connecting member, with a nut being engaged with a distal end of the bolt.

* * * * *